United States Patent
El Hadiyen

(10) Patent No.: US 12,103,453 B2
(45) Date of Patent: Oct. 1, 2024

(54) VEHICLE FOR TRANSPORTING OBJECTS

(71) Applicant: Abdelhoihid El Hadiyen, Autignac (FR)

(72) Inventor: Abdelhoihid El Hadiyen, Autignac (FR)

( * ) Notice: Subject to any disclaimer, the term of this patent is extended or adjusted under 35 U.S.C. 154(b) by 246 days.

(21) Appl. No.: 17/778,370

(22) PCT Filed: Nov. 20, 2020

(86) PCT No.: PCT/EP2020/082807
§ 371 (c)(1),
(2) Date: May 19, 2022

(87) PCT Pub. No.: WO2021/099530
PCT Pub. Date: May 27, 2021

(65) Prior Publication Data
US 2023/0001838 A1    Jan. 5, 2023

(51) Int. Cl.
*B60P 3/03* (2006.01)
*B66D 1/20* (2006.01)
*B66D 1/34* (2006.01)

(52) U.S. Cl.
CPC ............... *B60P 3/03* (2013.01); *B66D 1/20* (2013.01); *B66D 1/34* (2013.01)

(58) Field of Classification Search
CPC ........................................................ B60P 3/03
See application file for complete search history.

(56) References Cited

U.S. PATENT DOCUMENTS

| | | | |
|---|---|---|---|
| 1,380,229 A * | 5/1921 | White ................. | B61D 19/004 193/38 |
| 7,419,204 B2 * | 9/2008 | Coble .................... | B60P 1/435 296/57.1 |
| 9,114,692 B2 * | 8/2015 | Kerr, III .................... | E05F 5/00 |
| 10,286,873 B1 | 5/2019 | Krush | |
| 2002/0081184 A1 * | 6/2002 | Sternberg ............... | B60P 1/431 414/537 |
| 2013/0067817 A1 * | 3/2013 | Sorensen ............. | E05F 15/627 49/31 |

FOREIGN PATENT DOCUMENTS

| | | |
|---|---|---|
| DE | 10256638 A1 | 7/2004 |
| EP | 3339109 A1 | 6/2018 |

\* cited by examiner

*Primary Examiner* — Sang K Kim
*Assistant Examiner* — Nathaniel L Adams
(74) *Attorney, Agent, or Firm* — Craft Chu PLLC; Andrew W. Chu

(57) ABSTRACT

The vehicle for transporting objects includes a body which is intended to contain these objects, and the body comprises at least one opening and at least one door. Each door closes such an opening, and which, depending on the circumstances, prohibits or permits entry inside the body. The vehicle also includes a winch which is located inside the body and includes a hook, a cable having a free end that is provided with this hook, a drum for winding the cable, and a motor for driving this drum. The vehicle also includes a securing device for fixedly securing the winch to the body, at least one attaching device which the at least one door includes, while the hook of the winch engages directly or indirectly with the at least one attaching device, and remote controller for the motor of the winch.

8 Claims, 1 Drawing Sheet

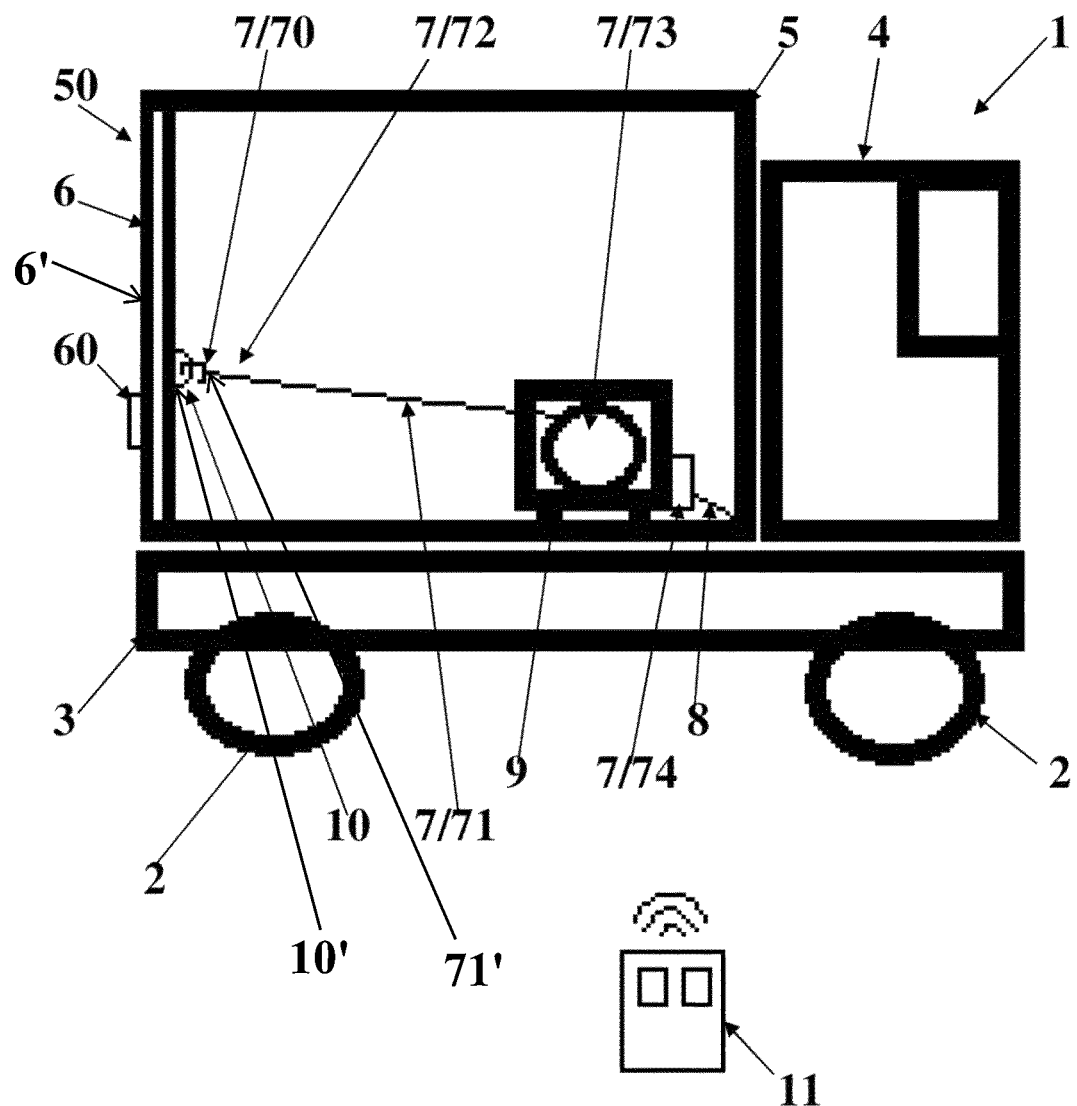

VEHICLE FOR TRANSPORTING OBJECTS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a vehicle for transporting objects.

2. Description of Related Art Including Information Disclosed Under 37 CFR 1.97 and 37 CFR 1.98

The invention relates to the field of vehicles for transporting objects, more particularly the field of the manufacture of systems which are designed to prevent the objects transported by such a vehicle for transporting objects from being stolen.

In this regard, it will be observed that such a vehicle for transporting objects is configured to transport objects which may have value, and which may consist of goods, equipment or tools, especially portable power tools.

These vehicles for transporting objects usually comprise rolling means, a chassis which is mounted on these rolling means, and a cabin which is mounted on this chassis and which accommodates people, in particular a driver, or even passengers. Such a vehicle for transporting objects further comprises at least one body which is mounted on the chassis, is intended to contain said objects, and comprises at least one opening. Such a vehicle for transporting objects also comprises at least one door, each of which closes such an opening of the body, and which, depending on the circumstances, prohibits or permits access to the objects contained in the body.

Such a vehicle for transporting objects also comprises a system for preventing an unauthorized third party from opening such a door and entering inside the body to steal such objects. Such a system usually comprises locking means (in particular in the form of a strike plate and bolt assembly) which are configured to lock such a door with respect to another door or with respect to the body, in the position in which an opening of the body is closed by such a door. This system also comprises control means which are configured to control these locking means, with a view to making them adopt a locking position (in which the door is held in a closed position and thus prohibits access to the body and to the objects contained therein) or an unlocking position (allowing the door to be opened and permitting access to the body and to the objects contained therein). These control means can take the form of a lock and a key.

It will be observed that these vehicles for transporting objects attract the greed of ill-intentioned individuals who are tempted to seize the objects contained in the body of such a vehicle. To do this, these individuals usually tamper with the control means, more particularly with the lock of these control means.

In this regard, it will be observed that these control means have a relatively limited tamper resistance such that they do not resist a tamper attempt for long, before giving way and giving free access to the objects contained in the body.

BRIEF SUMMARY OF THE INVENTION

The present invention is intended to remedy the disadvantages of vehicles for transporting objects and, in particular, the means for controlling the locking means which are provided in such vehicles.

To this end, the invention relates to a vehicle for transporting objects, this vehicle comprising a body which is intended to contain these objects and comprises at least one opening, and comprising at least one door, each of which closes such an opening, and which, depending on the circumstances, prohibits or permits entry inside the body. This vehicle for transporting objects is characterized in that it comprises a winch which is located inside the body and comprises a hook, a cable having a free end that is provided with this hook, a drum for winding the cable, and a motor for driving this drum, said vehicle also comprising securing means for fixedly securing the winch to the body, at least one attaching means which said at least one door comprises, while the hook of the winch engages directly or indirectly with said at least one attaching means, and remote control means for the motor of the winch.

Another feature relates to the fact that the vehicle comprises at least one door, in particular a rear door, which comprises said at least one attaching means while the hook of the winch engages directly with said at least one attaching means by hooking thereon.

Yet another feature relates to the fact that the vehicle comprises two doors, in particular a rear door and a side door, which each comprise at least one attaching means, and at least one connecting means for connecting the hook of the winch at least to said at least one attaching means.

Thus, the vehicle for transporting objects according to the invention comprises a winch which is fixedly secured to the body, means for attaching the hook of this winch (directly or indirectly) on a door of this vehicle, and remote control means for the motor of this winch.

These features make it possible for the hook of this winch to engage (directly or indirectly) with the attaching means that the door of such a vehicle comprises, in order to close this door, to actuate the remote control means for the motor of the winch until the cable of this winch is under tension, and to keep this cable under tension. This advantageously makes it possible, after the door of such a vehicle has been closed and despite deterioration of the means for controlling the locking means of the door, to keep and hold this door in its closed position, and thus to prevent this door from being opened and, therefore, to prohibit access inside the body of the vehicle and, consequently, to prevent the objects contained in this body from being stolen.

BRIEF DESCRIPTION OF THE SEVERAL VIEWS OF THE DRAWINGS

Other objects and advantages of the present invention will become apparent from the following description which relates to embodiments which are given only by way of indicative and non-limiting examples.

The understanding of this description will be facilitated by referring to the appended drawings.

The FIGURE is a schematic, side and cutaway view of a transport vehicle according to the invention.

DETAILED DESCRIPTION OF THE INVENTION

The present invention relates to the field of the manufacture of vehicles for transporting objects, more particularly the field of the manufacture of systems which are designed to prevent the objects transported by such a transport vehicle from being stolen.

Such a vehicle 1 for transporting objects comprises rolling means 2, a chassis 3 which is mounted on these rolling means 2, and a cabin 4 which is mounted on this chassis 3 and which accommodates people, in particular a driver, or even passengers.

Such a vehicle 1 for transporting objects further comprises at least one body 5 which is mounted on the chassis 3, is positioned at the rear of the cabin 4, and is intended to contain said objects.

Such a body 5 comprises at least one opening 50 which allows entry inside this body 5, for depositing or retrieving objects therein.

Such a vehicle 1 for transporting objects also comprises at least one door 6, each of which closes such an opening 50 of the body 5, and which, depending on the circumstances, prohibits or permits access to the objects contained in this body 5.

Such a door 6 usually comprises a system 60 for preventing an unauthorized third party from opening such a door 6 and entering inside the body 5 to steal such objects. Such a system 60 comprises locking means (not shown but which can take the form of a strike plate and bolt assembly) which are configured to lock such a door 6 with respect to another door 6 or with respect to the body 5, in the position in which an opening 50 of the body 5 is closed by such a door 6. This system 60 also comprises control means (not shown) which are configured to control these locking means, with a view to making them adopt a locking position (in which said door 6 is held in a closed position and thus prohibits access to the body 5 and to the objects contained therein) or an unlocking position (allowing said door 6 to be opened and permitting access to the body 5 and to the objects contained therein). These control means can take the form of a lock and a removable key.

According to the invention, this vehicle 1 for transporting objects comprises a winch 7 which is located inside the body 5 and comprises a hook 70, a cable 71 having a free end 72 that is provided with this hook 70, a drum 73 for winding the cable 71, and a motor 74 for driving this drum 73.

This vehicle 1 for transporting objects therefore also comprises electrical energy supply means 8 for the winch 7, more particularly for the motor 74 that this winch 7 comprises.

This vehicle 1 for transporting objects further comprises securing means 9 for fixedly securing the winch 7 to the body 5.

This vehicle 1 for transporting objects also comprises at least one attaching means 10 that said at least one door 6 comprises, while the hook 70 of the winch 7 engages directly or indirectly with said at least one attaching means 10.

Finally, this vehicle 1 for transporting objects comprises remote control means 11 for the winch 7, more particularly for the motor 74 of the winch 7.

Thus, as mentioned above, the vehicle 1 for transporting objects comprises at least one door 6.

This vehicle 1 for transporting objects therefore comprises, as shown in FIG. 1, at least one door 6, in particular at least one rear door 6, which comprises said at least one attaching means 10 while the hook 70 of the winch 7 engages directly with said at least one attaching means 10 by hooking thereon.

According to another embodiment (not shown), the vehicle 1 for transporting objects comprises at least two doors 6 (first door 6, second door 6'), in particular at least one rear door and one side door (more particularly of the sliding type), which each comprise at least one attaching means 10 (means for attaching the first door 10, means for attaching the second door 10'), and at least one connecting means (means 71' for connecting the means 10 for attaching the first door, the means 10' for attaching the second door, and the hook 70 of the winch 7) for connecting the hook 70 of the winch 7 at least to said at least one attaching means 10.

In fact, such a connecting means can be configured to connect the attaching means 10 that one of the doors 6 comprises to the attaching means 10 that the other door 6 comprises. It is with such a connecting means that the hook 70 of the winch 7 engages in order to be connected to the attaching means 10 that said doors 6 comprise, for an indirect engagement of this hook 70 with said at least one attaching means 10 (means for attaching the first door 10 being directly engaged, means for attaching the second door 10' being indirectly engaged).

In this regard, it will be observed that said at least one connecting means 71' may consist of a tensioner and/or a chain.

According to another feature, said at least one attaching means 10 is provided on an internal side of said at least one door 6.

Alternatively or (and preferably) additionally, said at least one attaching means 10 may each consist of an attaching ring which is secured to said at least one door 6.

As mentioned above, the vehicle 1 comprises remote control means 11 for the winch 7. These remote control means 11 can consist of a wireless remote control.

Yet another feature relates to the fact that the vehicle 1 for transporting objects (more particularly the winch 7) further comprises means for controlling the interruption of the winding of the cable 71 on the drum 73.

Such control means can be configured to control the interruption of the winding of the cable 71 of the winch 7, when this cable 71 is under tension.

In this regard, and additionally, the vehicle 1 for transporting objects (more particularly the winch 7), the means 11 for controlling includes the interruption of the winding and detecting when the cable 71 is under tension. The detection makes it possible, more particularly, to detect when the cable 71 is under tension with a view to interrupt the winding of the cable 71, by the means for controlling the interruption of this winding mentioned above.

Finally, the vehicle 1 for transporting objects comprises disengagement means for disengaging the winch 7, more particularly disengagement of the drum 73 and/or the motor 74 of the winch 7 from the first door 6.

Such disengagement makes it possible, in particular in the event of an emergency and/or malfunction of the winch 7 or of the remote control means 11, to release the motor 74 and/or the drum 73 and/or the cable 71, so as to permit the unwinding of this cable 71 and thus open said at least one door 6.

I claim:

1. A vehicle for transporting objects, comprising:
    a body having an opening and being comprised of a first door being configured to close said opening, and a second door being configured to close said opening cooperative with said first door;
    a winch being located inside body,
    wherein said winch is comprised of:
       a hook,
       a cable having a free end, said hook being provided on said free end,
       a drum being connected to said cable so as to wind said cable, and
       a motor connected to said drum so as to drive said drum;
    means for fixedly securing said winch to said body;
    means for attaching said first door to said hook of said winch;
    means for attaching said second door to said hook of said winch;
    means for connecting the means for attaching said first door, the means for attaching said second door, and said hook of said winch, the means for attaching said second door being indirectly connected to said hook of said winch; and
    means for control of said motor of said winch.

2. The vehicle for transporting objects according to claim 1, wherein the means for attaching said first door directly engages said hook of said winch.

3. The vehicle for transporting objects, according to claim 1, wherein the means for connecting is comprised of a tensioner, a chain, or both.

4. The vehicle for transporting objects, according to claim 1, wherein the means for attaching said first door is comprised of an attaching ring secured to said first door.

5. The vehicle for transporting objects, according to claim 1, wherein means for control is comprised of a wireless remote control.

6. The vehicle for transporting objects, according to claim 1, wherein the means for control is in communication with said winch so as to interrupt winding of said cable on said drum.

7. The vehicle for transporting objects, according to claim 6, wherein the means for control is in communication with said winch so as to detect said cable being under tension.

8. The vehicle for transporting objects according to claim 1, wherein said winch is removably disengageable from said first door.

* * * * *